Oct. 12, 1965   M. R. LEIBOWITZ   3,211,908
SPECTRUM DISCRIMINATING RADIATION DETECTOR
Filed July 19, 1961
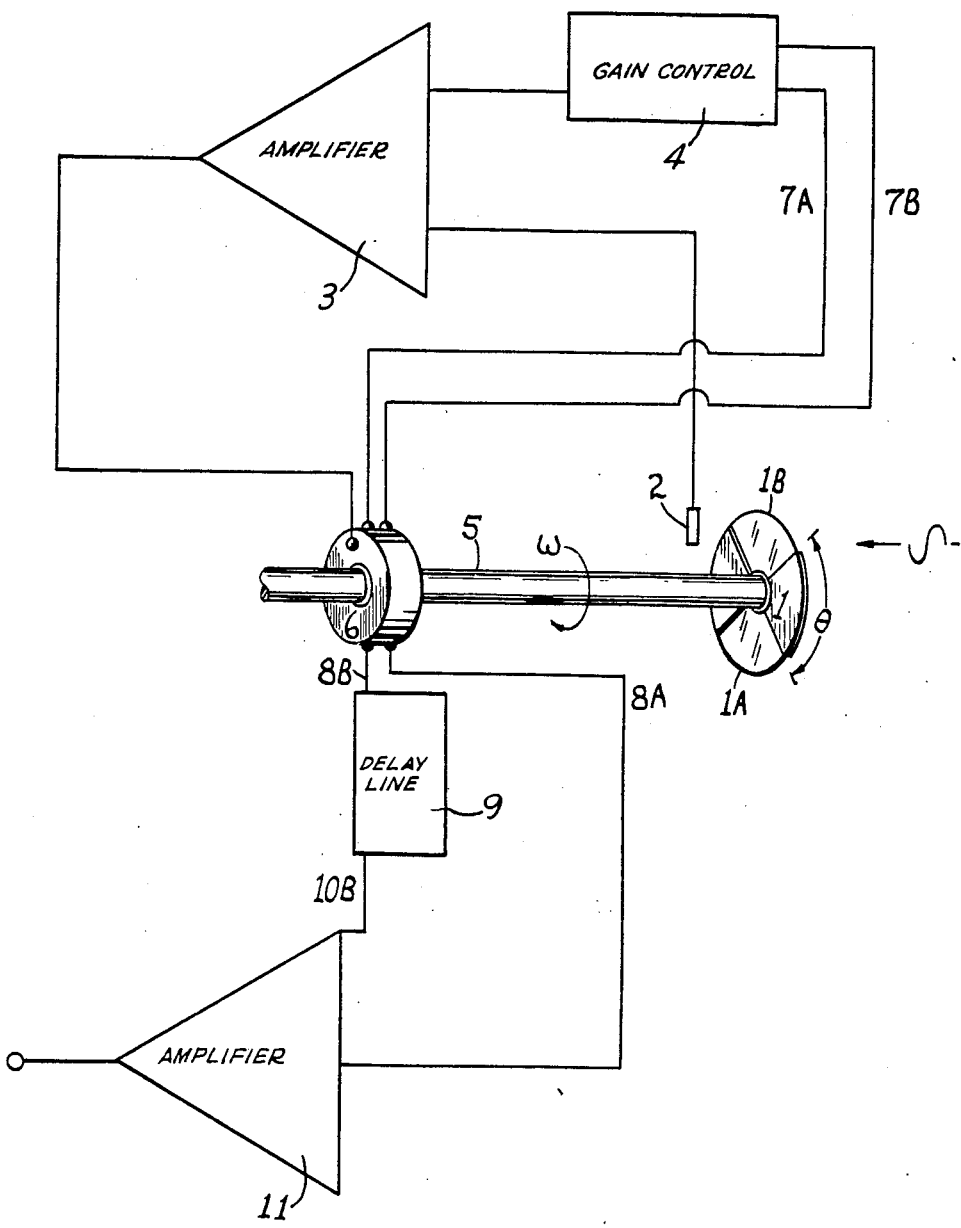
INVENTOR.
Michael R. Leibowitz

3,211,908
SPECTRUM DISCRIMINATING RADIATION
DETECTOR
Michael R. Liebowitz, 1620 Ocean Ave., Brooklyn, N.Y.
Filed July 19, 1961, Ser. No. 126,849
5 Claims. (Cl. 250—83.3)

My present invention relates to the science of detecting radiation, most specifically infra red radiation although the concepts involved might as well be applied to all radiation of a separable phenomena.

Sometimes it is desired that a detector give a response only when one particular wavelength of incident radiation predominates energywise, or has a chosen relationship in incident energy to another wavelength. A practical use of such a detector would be in an infra red sensing system. It is desirable that infra red guided missiles shun fireball decoys and targets already hit and burning. An ordinary sensing system will be most strongly attracted to a burning target or a fireball decoy, because the hotter an object is, the more infra red of all wavelengths the object will radiate. However, the spectral distribution of the radiant energy will change with temperature, the wavelength of the energy maxima decreasing with temperature rise. Also the burning of hydrocarbons in the atmosphere, that occurs when fuel in a hit target burns, produces a characteristic spectral distribution of infra red energy. Thus if the detector will respond only when a chosen wavelength predominates over another, the sensing system will seek only those targets radiating the chosen spectral distribution, and will shun others. In choosing the wavelengths to be compared one would have to consider the atmospheric transmission as a function of wavelength as well as the spectrum of various target emissions.

The object of this invention is to set forth a radiation sensing system that will respond only when a chosen wavelength of incident radiation bears a determined relationship to another chosen wavelength. This is accomplished by separating the wavelengths chosen for comparison and having them excite a detector at different times in a cycle. The detected outputs corresponding to the bands chosen for comparison are amplified and compared with a response being elicited only if the band energies have a chosen relationship.

An embodiment of the invention is illustrated in the drawing which is partially in block diagram form. 1 is a chopper having different filters 1A and 1B in its openings. Ordinarily the light chopper is used to obtain an intermittent excitation from the radiation to produce an intermittent signal from the detector which allows the employment of an A.C. amplifier. Here the openings have filters 1A and 1B so that the quality of the radiation obtained from one opening will de different from that obtained from the other opening. The filters may be band pass or high and low pass; or one opening may have no filter, to compare an all pass response with some restricted pass band response. Generally any filter arrangement can be used that selects one wavelength of radiation to compare with another. Detector 2 is a sensing element which yields a pulsed response from an intermittent excitation. Amplifier 3 amplifies the response of detector 2 in accordance with gain control 4. Shaft 5 links chopper 1 and switch 6 which may be of the rotary brush type. Chopper 1 and switch 6 run synchronously. Lines 7A and 7B from switch 6 to gain control 4 allow the amplifier gain to be switched by switch 6 synchronously with the exposing of detector 2 by filters 1A and 1B respectively. The mechanism of gain control could be by negative feedback, bias variation, or any suitable method well known in the electrical engineering art. The output of amplifier 3 is fed to switch 6 which synchronously injects the signal into line 8A or line 8B cyclically with the exposure of detector 2 by filter 1A or 1B respectively. Thus lines 8A and 8B carry the amplified response of the detector 2 to the wavelengths going through filter 1A and 1B respectively. Delay line 9 delays the signal on line 8B for an interval equal to $\theta/\omega$ where $\theta$ is the central angle in radians of the opaque segment of chopper 1, and $\omega$ is the shaft speed in radians per second. Thus lines 8A and 10B now simultaneously carry the signals due to the exposure of detector 2 to the different bands passed by filters 1A and 1B respectively.

The attenuation due to the delay line 9 and the difference of attenuation if any on the pass wavelengths through filters 1A and 1B may be compensated for by the differential gain control corresponding to the A part of the cycle (when filter 1A exposes detector 2) and the B part of the cycle (when filter 1B exposes detector 2). Amplifier 11 has an input polarity corresponding to the output polarity of amplifier 3. Amplifier 11 has a floating ground which is connected to line 10B. The B part of the cycle should correspond to the wavelength chosen for weakest energy. Line 8A goes to the amplifier input. Amplifier 11 will see no input then unless the magnitude of the signal on 8A is greater than that on 10B. Thus amplifier 11 will have no output unless the wavelengths transmitted through filter 1A have the requisite energy predominance over those transmitted by filter 1B. Line 10B must have the reference signal on it whenever line 8A has a signal on it or else a signal will be fed into amplifier 11 regardless of the relative signal strengths on line 8A and 10B. To insure that line 10B has a signal on it whenever line 8A has, the aperture of filter 1B might be made slightly larger than the aperture of filter 1A with a corresponding adjustment in synchronized switch 6. Also the delay line interval could be made slightly less than $\theta/\omega$.

The invention will be further clarified by considering a practical example. Assume that we wish to record a response only when the incident radiant energy at wavelengths of $4\mu$ to $5\mu$ is more than four times as great as that at $2\mu$ to $3\mu$. 1B could be a band pass filter passing wavelengths of $2\mu$ to $3\mu$ and 1A could be a filter passing $4\mu$ to $5\mu$. However if the spectral response of the detector does not extend much beyond this range, 1B could be a high pass filter cutting off at $3.5\mu$ and 1A could be a low pass filter cutting off in the same region. Now we only wish a response if the longer wavelength band has over four times the energy of the shorter wavelength band. Therefore, during the part of the cycle in which the radiation goes through filter 1B the gain of amplifier 3 is four times what it is when the radiation goes through filter 1A. This is accomplished through gain control 4 and the synchronously coupled switch 6. Then if the A infra red signal is four times as strong as the B signal, lines 8A and 10B will have electrical signals of equal strength, and in these lines the signals will occur simultaneously as the B signal was delayed in delay line 9 by $\theta/\omega$. If the A infra red signal is over four times as strong as the B signal, then the electrical signal in 8A will be greater than that in 10B and amplifier 11 will see a signal at its input.

The gain ratio of four in amplifier 3 presumed equal attenuation in the passband in filters 1A and 1B, as well as equal and linear responsivity in the detector for both bands. If this is not the case then the figure of four for the gain ratio will have to be modified.

Many variations on the above system could be effected without departing from the scope of the basic invention. The chopper with the two filters in it, for instance, is the means shown for generating and A.C. signal and at the same time passing different wavelength bands during different parts of the cycle. The same thing could be effected with a rocking prism, of a rocking refraction or reflection grating which would be ganged to a switch with which it would operate synchronously. In the final stage as shown the amplifier has a floating chassis and the B signal is grounded to it. Thus the amplifier will only respond if the A signal is greater than the B signal, both signals being of the input polarity for this amplifier. Actually there are many systems known in the electrical engineering art which will trigger an amplifier or some signaling response only if one signal is greater than another, and any one of these could be used without loss of generality. Another variation would be to have the first amplifier working at constant gain and having the second amplifier (or signaling device) set to be triggered only by a chosen relationship in the magnitude of the two inputs.

While a particular embodiment of the present invention has been described in detail above, as has been pointed out, numerous modifications could be made without departing from the scope of the invention as set forth in the appended claims.

I claim:

1. An apparatus responding to radiation of a chosen spectral distribution, said apparatus comprising means for separating the radiation into bands and means for detecting said bands sequentially in time, the sequence becoming effectively a spectrum division cycle, each band undergoing minimum attenuation during its part of the cycle; said detector means yielding outputs sequentially during the cycle, means for comparing the detected outputs corresponding to different parts of the spectrum division cycle, and for passing a final response only if the responses elicited by the different bands have a chosen relationship to each other.

2. An apparatus as recited in claim 1, wherein the output from the detector enters an amplifier, the gain of which is varied synchronously with the spectrum division cycle, the gain applied to each part of the cycle capable of being set in a chosen manner.

3. An apparatus as recited in claim 2, wherein the output of the amplifier is switched synchronously with the parts of the spectrum division cycle so that the outputs corresponding to different parts of the cycle are fed to different lines having different delays, the delays corresponding to the time durations of different parts of the cycle so that the outputs reach a comparing network simultaneously.

4. An apparatus as recited in claim 3, wherein the synchronous switch maintains similar polarity of the amplifier output relative to the different lines.

5. An apparatus as recited in claim 3, wherein the synchronous switch reverses polarity of the amplifier output relative to the different lines.

References Cited by the Examiner

UNITED STATES PATENTS

| | | | |
|---|---|---|---|
| 2,467,120 | 4/49 | Evans | 250—83.3 |
| 2,517,554 | 8/50 | Froomer | 88—14 |
| 2,654,845 | 10/53 | Presenz | 250—43.5 |
| 2,775,160 | 12/56 | Foskett | 250—43.5 |
| 2,927,212 | 3/60 | Shimukonis et al. | 250—83.3 |
| 3,004,664 | 10/61 | Dreyfus | 250—43.5 |
| 3,026,413 | 3/62 | Taylor | 250—83.3 |
| 3,030,512 | 4/62 | Harker | 250—86 |

RALPH G. NILSON, *Primary Examiner.*

JAMES W. LAWRENCE, *Examiner.*